J. PAUDOIS.
ANIMAL TRAP.
APPLICATION FILED AUG. 21, 1919.
1,344,712.
Patented June 29, 1920.
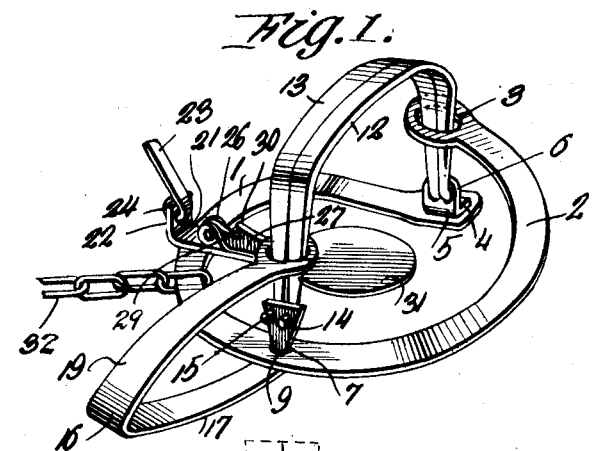
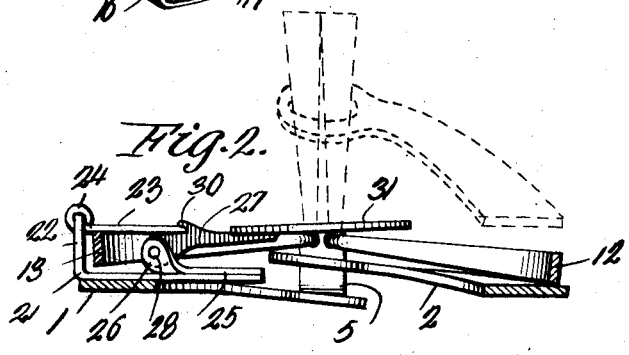
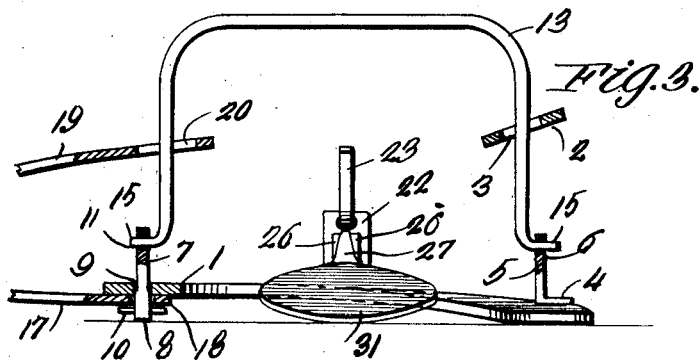
WITNESSES
Guy M. Spring
J. P. Campbell.
Inventor
JULES PAUDOIS
By Richard B. Owen
Attorney

UNITED STATES PATENT OFFICE.

JULES PAUDOIS, OF OPHEIM, MONTANA.

ANIMAL-TRAP.

1,344,712.  Specification of Letters Patent.  Patented June 29, 1920.

Application filed August 21, 1919. Serial No. 318,940.

*To all whom it may concern:*

Be it known that I, JULES PAUDOIS, having declared my intention to become a citizen of the United States, being now a citizen of Canada, residing at Opheim, in the county of Valley and State of Montana, have invented certain new and useful Improvements in Animal-Traps, of which the following is a specification.

My invention relates to new and useful improvements in animal traps and has for its principal object the provision of a trap of such construction that it will be easily operated by the animal contacting with the trigger.

A further object of the invention resides in the construction of a trap with two springs whereby the jaws will operate with greater force and more securely hold the animal in the trap.

A still further object consists in constructing the base of the trap in such a manner that it forms one of the springs for operating the jaws.

With these and other objects in view my invention consists in the novel details of construction and arrangement of parts which will be more clearly understood from the following specification and drawings in which:

Figure 1 is a perspective view of the trap.

Fig. 2 is a transverse vertical section through the trap showing in full lines the jaws open and in dotted lines the jaws closed, and Fig. 3 is a longitudinal vertical section through the trap with the jaws closed.

In the drawings the numeral 1 indicates the base of the trap which is formed of a single strip of material curved so as to form a substantially circular base. The strip forming the base is bent upwardly to form a spring arm 2 having an opening 3 adjacent the end thereof. A plate 4 having the vertical extension 5 is secured to the lower end of the base 1 and is provided with a plurality of openings 6 for a purpose to be later described. A vertical plate 7 is secured to the opposite side of the base, in alinement with the plate 4, by having a reduced extension 8 passing through an opening 9 formed in the base. A transverse pin 10 is adapted to pass through an opening formed in the reduced extension 8. The plate 7 is provided with a plurality of openings 11 which are in alinement with the openings 6 formed in the vertical extension 5 on the plate 4. Jaws 12 and 13 are provided with extensions 14 and 15 respectively and these extensions are adapted to pass through the openings 6 and 11 formed in the plates 5 and 7 respectively. The jaws are thus pivotally connected to the base so that they may be opened as more clearly illustrated in Fig. 2 of the drawings.

A spring 16 is adapted to be secured to the base and engage the jaws. This spring comprises a bottom arm 17 provided with an opening 18 through which the reduced end 8 of the plate 7 is adapted to pass. The transverse pin 10 is adapted to engage the underside of this arm 17 of the spring for securing it in position upon the reduced end of the plate 7. The upper arm 19 of the spring 16 is provided adjacent the end with an opening 20 through which the arms of the jaws 12 and 13 are adapted to pass. It will also be seen that the opposite arms of the jaws pass through the opening 3 formed in the spring extension 2 of the base 1. The springs 2 and 16 when in their normal position hold the jaws closed as more particularly illustrated in Figs. 1 and 3 of the drawings.

A plate 21 is adapted to be connected to the base 1, at right angles to the jaws 12 and 13, and this plate 21 is provided with the vertical extension 22 having an opening therein. A catch 23 is secured to this vertical extension by means of its end 24 passing through the opening in the extension and being curved to form an eye. A second plate 25 is secured to the plate 21 and is formed with the spaced ears 26. A trigger bar 27 is pivotally connected to the ears 26 by means of a pin 28 passing through the ears and through the bar. This bar 27 is provided with the notch 29 forming a projection 30 for the purpose to be presently described. A circular plate 31 is adapted to be connected to the free end of the trigger bar 27.

A chain 32 is secured to the base 1 for connecting the trap to any suitable object to prevent its being pulled away by the animal caught in the trap.

From the above detailed description it is thought that the construction and operation of my trap will be clearly understood. When the trap is set ready for catching the animal the parts will be in the position indicated in full lines in Fig. 2 of the drawing. The jaws will be swung down and the spring arm 2 be pressed so that it will extend over the vertical extension 5 formed on the plate 4. The arm 19 of the spring 16 will also be forced down to engage over the plate 7. The catch 23 is folded over the edge of the jaw 13 and engaged in the notch 29 formed in the trigger bar 27 and engaged beneath the projection 30. The plate 31 will be elevated in the position shown. When the animal engages the plate 31 it will be lowered thereby disconnecting the projection 30 from the catch 23. The arm 19 of the spring 16 and the spring 2 will fly upwardly thereby closing the jaws 12 and 13 to catch the animal therebetween. The two springs are of such strength as to securely hold the animal between the jaws and prevent his escape.

It will be noted that the spring 2 is formed integral and as a part of the base 1 and that by providing the two springs the jaws will be more readily closed and more securely hold the animal between the jaws.

The foregoing description and the drawings have reference to what may be considered the preferred, or approved, form of my invention. It is to be understood that I may make such changes in construction and arrangement and combination of parts, materials, dimensions, etc., as may prove expedient and fall within the scope of the appended claim.

Having fully described my invention what I claim as new and desire to secure by Letters Patent is:—

An animal trap comprising a base formed of a single strip of material bent to form an upwardly extending spring arm having an opening adjacent the end, the end of the spring arm overlying the opposite end of the strip and vertically spaced therefrom, a plate secured to the base beneath the opening in the spring arm, a V-shape plate secured to the opposite side of the base, a shank formed on the V-shape plate and extending through the base, also said plates provided with apertures, jaws having lugs at their extremities so as to be pivotally connected in the apertures of said plates, one end of the jaws passing through the opening in the spring arm, a second spring secured to the shank of the second mentioned plate and provided with an opening through which the opposite ends of the jaws pass, and a trigger for engaging one of the jaws.

In testimony whereof I affix my signature in presence of two witnesses.

JULES PAUDOIS. [L. S.]

Witnesses:
   JOHN B. ST. GERMAIN,
   WILBUR EDWARD FLORENCE.